Nov. 4, 1952 — T. MORENO — 2,616,951
ULTRAHIGH-FREQUENCY BRIDGE
Filed Oct. 4, 1944 — 2 SHEETS—SHEET 1

INVENTOR
THEODORE MORENO
BY Paul B. Hunter
ATTORNEY

Nov. 4, 1952 T. MORENO 2,616,951
ULTRAHIGH-FREQUENCY BRIDGE
Filed Oct. 4, 1944 2 SHEETS—SHEET 2
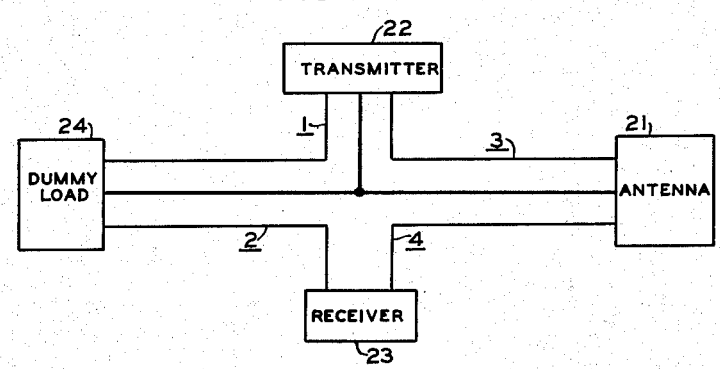
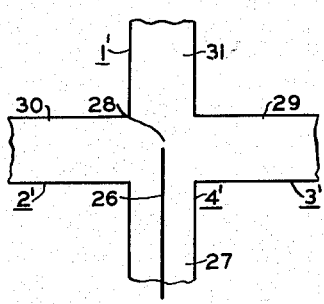 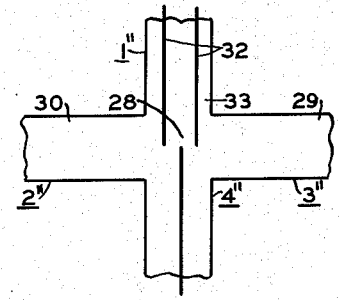
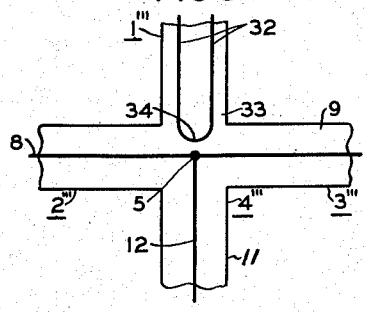 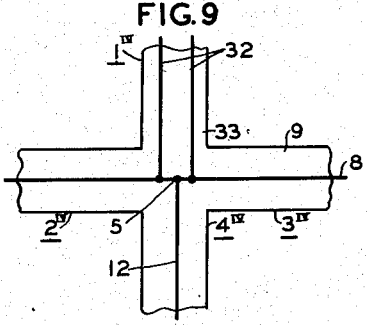
INVENTOR
THEODORE MORENO
BY
ATTORNEY Patented Nov. 4, 1952

2,616,951

UNITED STATES PATENT OFFICE 2,616,951

ULTRAHIGH-FREQUENCY BRIDGE

Theodore Moreno, Garden City, N. Y., assignor to The Sperry Corporation, a corporation of Delaware Application October 4, 1944, Serial No. 557,182

9 Claims. (Cl. 175—183)

This invention relates to ultra high and microwave frequency bridge circuits.

A bridge circuit, as is well known, is a circuit network having several interconnected branches or arms which are so arranged that when an electromotive force is present in one branch, the response of a suitable detecting device in another branch may be made zero by a balancing adjustment of the electrical constants of the network. Usually such circuits are characterized by the fact that if the detecting device and the electromotive force are interchanged, with the bridge circuit in its balanced condition, the response of the detecting device is still zero.

The problem in all bridges is to evolve a circuit apparatus having electrical constants which may be adjusted to give a null output at a detector or output arm of the device with an input applied to another arm.

In a low frequency bridge, such as the Wheatstone bridge, the electrical constants of the bridge are considered to be concentrated at predetermined points in the form of lumped impedances. The distributed constants in the circuit are almost entirely due to the interconnecting conductors between these impedances and, for all practical purposes, are considered to have little effect on the operation of the bridge.

However, at higher frequencies, say about 10 million cycles per second, the errors consequent to the presence of even very small stray inductances and capacitances or interconnecting conductors limit the useful frequency range and flexibility of the bridge considerably. Further extension of the use of these conventional bridge circuits to ultra high frequencies and beyond presents many difficulties.

Although bridges have been constructed that function at frequencies in the neighborhood of 20 megacycles per second, little has been done in constructing bridges that operate at very high frequencies such as those in the order of $10^9$ cycles per second, owing to the various complications and uncertainties which arise and which mount rapidly in importance with increasing frequency range.

As the frequency range increases, the distributed constants of the usual bridge circuit become more and more significant in determining the action of the bridge or bridge circuit. For example, as applied to the measurement of the impedances, the use of these bridge circuits at ultra high frequency is adversely affected by the impedance and calibration of the indicating instrument, by the effect of the leads to the auxiliary equipment, and similar factors which vary with frequency so that the useful frequency range of any one of these bridges or bridge circuits becomes rather limited. In addition, these conventional ultra high frequency circuits do not provide true equivalents of bridge circuits at extremely high frequencies in many applications where it is desirable to take advantage of the characteristic of a bridge connection, since such conventional circuits may not give true null indications or balanced outputs.

Known types of bridges offered for use at ultra high frequencies attempt by various expedients to overcome the deleterious effect of the distributed constants present in their bridge circuits or networks. In these known ultra high frequency bridges, four impedance elements are interconnected by finite lengths of transmission line in "ring" fashion. One opposite pair of elements serves as "balancing" impedance elements. A third element serves as an input and is adapted to be connected to, or is formed by a suitable high frequency generator. The fourth element is an output element and is adapted to be connected to, or is formed by, a suitable load or detector, such as a null indicator. When the lengths of interconnecting line and the balancing elements are properly selected or adjusted, no output appears at the fourth element even when power is supplied at the input.

In contradistinction to these bridges, is the present improved ultra high frequency bridge.

The present improved ultra high frequency bridge circuit has all the bridge elements connected to a common point and does not have interconnecting transmission line elements sequentially joining the impedance elements as in prior forms of bridge. In a form adapted for making impedance measurements, neither the impedance of the indicating instrument nor its calibration enters into the precision of the measurement. Further, the input impedance of the present bridge has been found to remain substantially constant with wide variations of the input frequency.

This improved bridge comprises an input arm to which may be connected a suitable generator or source, two other arms known as balancing arms (since suitable impedances or loads are connected to them in order to balance the bridge) and a fourth arm which serves as the detector or output arm. When balanced, the input and output arms may be interchanged.

An important and novel feature of the present bridge consists in the manner of connecting the input or generator arm of the bridge and the detector or output arm of the bridge in relation to the balancing arms of the bridge. If the input arm of the bridge is connected in shunt to the balancing arms, so that these arms are fed equal voltages in phase, then the output or detector arm is connected in series with the balancing arms so as not to respond to currents in the balancing arms that are equal and in phase. However, either one of the arms connected to the balancing arms may act as the input while the other then acts as the output.

One object of the invention is to provide an improved bridge circuit adapted to operate over a wide range of frequencies, and particularly at ultra high and microwave frequencies.

Another object is to provide an improved bridge circuit having a plurality of arms connected at a single point.

Another object is to provide an improved bridge circuit having a substantially constant input impedance characteristic with varying input frequencies.

Still another object is to provide an improved arrangement for interconnecting a plurality of circuits with one or more other circuits so as to prevent interaction among the said plurality of circuits.

Yet another object is to provide an improved bridge circuit adapted for making impedance measurements at ultra high frequencies and microwave frequencies.

Yet another object is to provide an improved bridge circuit of the character described, adapted for interconnection in systems of metal pipe wave guide construction or coaxial line or parallel wire transmission line construction, or systems using any combination of these.

Other objects and advantages of the invention will become apparent as the description proceeds.

The invention will be more readily understood in the following description taken together with the accompanying drawings, in which:

Fig. 5 is a schematic diagram illustrating an embodiment of the bridge according to the present invention used as an isolating device between a high frequency transmitter and its receiver utilizing a common antenna;

Fig. 6 is a schematic diagram of another modification of the bridge of the present invention, having two wave guide balancing arms, a third wave guide arm and a fourth arm in the form of a coaxial line;

Fig. 7 is a schematic diagram of a bridge according to the present invention, having two wave guide balancing arms, a third parallel two-wire line arm and a fourth arm in the form of a coaxial line construction;

Fig. 8 is a schematic diagram of a modified bridge having two coaxial lines as balancing arms, a third coaxial line arm and a fourth balanced two-wire line arm which is looped for excitation; and Fig. 9 is a schematic diagram of another modified bridge having two coaxial line balancing arms, a coaxial line third arm, and a fourth arm directly coupled to the other arms and being of balanced two-wire line construction.

The great majority of those who have attempted to overcome the difficulties inherent in constructing high frequency bridges, especially in bridges designed for use at ultra high and microwave frequencies, have in most instances used portions of transmission line as interconnecting elements between the arms of their bridges. Although this has worked to a great extent in overcoming many of the attendant difficulties, the mere fact of having transmission lines interconnecting the arms of the bridges has presented a problem which has not heretofore been solved.

This problem results from the fact that these bridges have physical finite lengths of transmission lines interconnecting the bridge arms. It is readily seen that although the physical length of the transmission line connecting these arms remains constant, the electrical characteristic of the transmission line will change with varying input frequency since their "electrical lengths" vary.

If, for example, an output load is in perfect bridge adjustment at a definite frequency, it receives no signal or energy. However, due to the finite lengths of interconnecting transmission line, if the input frequency varies, the electrical lengths of these transmission lines will in turn vary, resulting in a change in the input impedance of the bridge.

The present bridge overcomes this grave defect by doing away with the ring-like interconnections between the arms of the bridge. The present ultra high frequency bridge is thus not appreciably influenced by a changing input frequency, but rather possesses substantially constant input impedance characteristics over an extremely wide band of frequencies. The essence of the bridge lies in a novel construction having all the bridge arms connected at a common point. The input arm is connected in shunt with the arms carrying the balancing loads or impedances, and the output arm is connected in series with the arms carrying the balancing loads. However, either the shunt arm or series arm may act as the input or output to the bridge, the use of these arms being reciprocal in function. Further, the present bridge may utilize any form of ultra high frequency energy conductor to connect the bridge arms to their common junction, including wave guides, coaxial transmission lines or parallel-wire transmission lines. The balancing arms of the bridge are usually of the same type energy conductor. The input and output arms may use conductors of the same or different types, which may also be different from one another.

Figure 1:
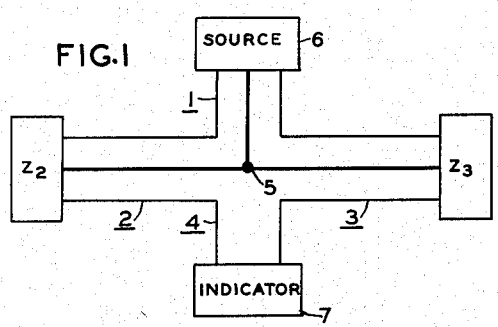
Fig. 1 is a simple schematic diagram of an embodiment of the improved bridge, used for purposes of explaining the theory thereof.

Referring to the drawings, Fig. 1 shows a schematic diagram of one form of bridge of the present invention useful in explaining its theory.

Arms 2 and 3 are the balancing arms, and are shown in the form of coaxial lines or sections connected at point 5 and having impedances $Z_2$ and $Z_3$ respectively connected at their outer ends. Arm 1 is the input arm and is shown as a similar coaxial line connecting a high frequency source 6 to point 5. Arm 4 is the output arm and is illustrated as a wave guide having one end communicating with the coaxial lines at point 5, and the other end connected to a suitable load or indicator 7. In this way source 6 is connected in shunt with the balancing arms 2 and 3, while indicator or load 7 is connected in series with arms 2 and 3. The structure of these arms may be as shown in Figs. 2 and 3 described below.

Since arms 2 and 3 are fed in parallel by the source 6, the voltages existing across the input to these arms at point 5 must be equal regardless of the impedances of arms 2 and 3. But the current that flows in arms 2 or 3 necessarily depends upon the respective impedances of these arms. If the impedances $Z_2$ and $Z_3$, respectively, of these arms are not equal, there will be a corresponding inequality in the currents flowing in the closed circuits of arms 2 and 3. Since arms 2 and 3 are coupled to arm 4 in series, so that arm 4 is excited by the difference in current flow in the balancing arms 2 and 3, any inequality in current flow in arms 2 and 3 will result in a voltage at arm 4 developed by the flow of current across the impedance of arm 4. If the impedances or arms 2 and 3 are equal, there will be no differential current flowing and no voltage will appear at arm 4. The circuit is then balanced in the sense that an ordinary bridge network is balanced, since a voltage applied to arm 1 of the bridge is incapable of producing any voltage in a second arm 4 of the bridge. The source 6 and load 7 may, of course, be interchanged without affecting the bridge balance.

The bridge just described has been found to have an input impedance which is substantially constant over a wide range of source frequencies. This is believed due to the type of connection of the bridge arms, using one common junction point 5.

Figure 2:
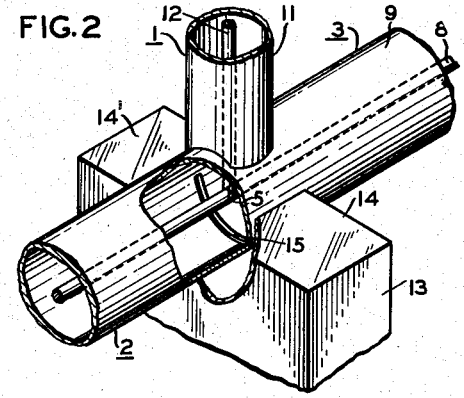
Fig. 2 is a perspective view, with parts in cross section of a preferred embodiment of the improved bridge of the present invention having three coaxial line arms and a fourth arm in the form of a rectangular wave guide.
Figure 3:
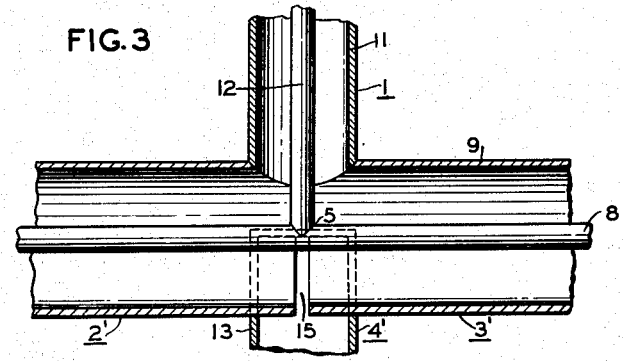
Fig. 3 is a cross sectional elevational view of the preferred embodiment of the improved bridge of the present invention having three coaxial line arms and a fourth arm in the form of a rectangular wave guide.

Figs. 2 and 3 illustrate a physical form which the bridge schematically shown in Fig. 1 may assume. The inter-connecting conductors of arms 2 and 3 may take the form of a single coaxial transmission line having an inner conductor 8 and an outer conductor 9.

Arm 1 is also formed by a coaxial line having an outer conductor 11 joined to conductor 9 at an opening in the wall thereof. The inner conductor 12 of arm 1 is connected directly to conductor 8 at point 5.

Arm 4 is formed by a rectangular wave guide 13 having its axis perpendicular to coaxial line 8, 9 and with its narrow dimension extending along line 8, 9. The end of guide 13 partially surrounds the outer wall of conductor 9, end plates 14, 14' being used to complete the closure of guide 13.

For coupling guide 13 to the remainder of the device, a narrow slot 15 is formed in the conductor 9 permitting communication between the guide 13 and the interior of conductor 9. This slot extends in a plane perpendicular to the axis of line 8, 9, so that its width extends along the direction of the electric field in guide 13. In this way, the excitation of guide 13 through slot 15 is responsive to the displacement current flowing across the slot within conductor 9, which in turn is proportional to the difference between the currents of arms 2 and 3. Therefore guide 13 is truly series-connected to arms 2 and 3.

For tight coupling, the length of slot 15 should be large. In the device of Figs. 2 and 3, this length is limited by the diameter of lines 8, 9, which is determined usually by the conventional dimensions for such lines. To permit greater length for slot 15, recourse may be had to the construction of Fig. 4 which is a slight modification of the bridge of Figs. 2 and 3.

Figure 4:
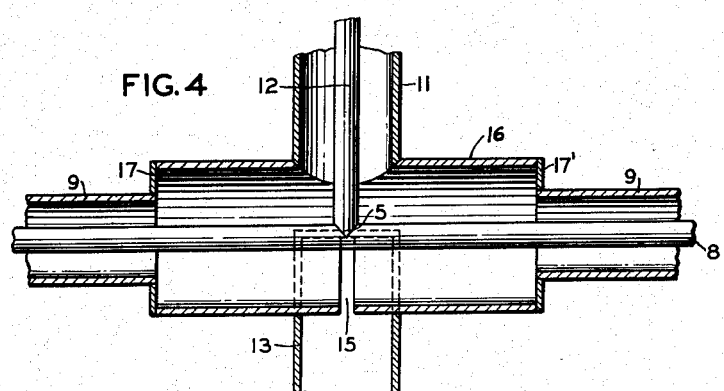
Fig. 4 is a cross sectional elevational view showing a modification of the improved bridge structure illustrated in Fig. 3.

In Fig. 4, the portion of arms 2 and 3 near the junction point 5 has an enlarged diameter formed by an enlarged sleeve 16 joined to conductor 9 by suitable discs 17, 17'.

This is a mechanical expedient allowing the use of coaxial lines 8, 9 and 11, 12 of usual dimension, and yet maintaining the necessary slot dimensions for adequate coupling of the wave guide to the coaxial line.

If it is desired to provide a coupling between the coaxial line 8, 9 and the wave guide 13 which has a narrow band frequency response, the slot 15 may be dimensioned to be resonant at the frequency of the wave-energy to be coupled therethrough.

Bridges of the type described above have many uses. One major use is in the measurement of impedances. For this purpose, an impedance to be measured is used as impedance $Z_2$ of Fig. 1. A standard, variable, calibrated impedance is connected as $Z_3$. With source 6 and indicator 7 connected as in Fig. 1, indicator 7 will give a null indication only when the calibrated impedance has been adjusted to be equal to the unknown impedance.

Fig. 5 illustrates another important application of the present bridge in excluding power from one bridge arm while supplying power to another arm from a generator or transmitter for transmission to a further arm. One of the balancing arms 3 is terminated in a suitable antenna indicated schematically at 21 for both receiving and radiating electromagnetic waves. The input arm 1 is connected to a transmitter 22, while the output arm 4 is connected to a receiver 23. The transmitter 22 and receiver 23 may be interchanged. A dummy load 24 is connected to the other balancing arm 2 and is adjusted or selected to have an impedance value balancing that of antenna 21, so that the bridge is balanced.

Since the bridge is properly balanced, transmitted energy is not received or felt by the receiver, but is radiated out into space from the antenna 21. The received energy is received on the same antenna 21, and is fed to the receiver 23. In this way receiver 23 and transmitter 22 are completely isolated from one another, permitting use of a common antenna. This arrangement may therefore be used in duplex communication systems or in echo-type object detecting and locating systems.

Many other uses of bridges of the present type are also possible. Thus, the impedance $Z_2$ connected to the balancing arm 2 may be replaced by a rectifier crystal unit. The other balancing impedance $Z_3$ may be a similar crystal or a dummy balancing impedance of the same impedance value. The input arm 1 may then be connected to a suitable receiving antenna or other source of high frequency wave, while the output arm may be connected to a local oscillator or other source of heterodyning frequency wave. The received wave impressed on arm 1 and the local oscillator or heterodyning wave impressed on arm 4 will then be mixed by the rectifier connected to arm 2, so that an intermediate frequency output may be derived therefrom. If both arms 2 and 3 are connected to crystals, then two intermediate frequency outputs will be derived and may be suitable combined. In each case, however, since the bridge is in balanced condition, none of the received energy is lost to the local oscillator circuit connected to the output arm. In view of this relative isolation of local oscillator and receiver circuits, the local oscillator requires much less power output and may be more tightly coupled to the mixer circuit. It will be understood that such mixer circuits can be used apart from heterodyne receiver frequency wherever the mixing of two waves of the same or different frequencies, with relative isolation between their circuits, is required. Obviously, the input and output arms may also be interchanged here.

While a preferred embodiment of the present invention has been described above, many other forms of bridges are possible, all having the common feature that the four bridge arms are connected at a common point. Thus, other forms of high frequency energy conductors may be substituted for the coaxial line or wave guide arms shown in the above Figs. 2 to 4.

Fig. 6 schematically illustrates a bridge circuit in which the balancing arms 2' and 3' are formed by wave guide sections 29 and 30 communicating at 28. The input arm 1 is also formed of a wave guide section 31, and the output arm 4 is formed by a coaxial line section having inner conductor 26 and outer conductor 27. The inner conductor 26 extends within the space 28 formed by the junction of the wave guide arms 29, 30 and 31, and thus acts in the nature of a probe antenna for coupling line 26, 27 to the wave guides. The line 26, 27 is thus effectively in shunt with the balancing arm wave guides 29 and 30, while wave guide 31 is in series with the balancing arms 29 and 30, as required.

Fig. 7 shows a further modification similar to Fig. 6, but in which the arm 1 is formed as a shielded two-wire transmission line, comprising a pair of parallel conductors 32 surrounded by shield 33. Shield 33 is connected to the wave guide arms 29 and 30, while the conductors 32 extend within the junction space 28. Arm 1 is thereby still in effective series relation with the balancing arms 29 and 30.

Fig. 8 illustrates another embodiment of the invention having balancing arms 2 and 3 and output arm 4 in the form of T-connected coaxial lines 8, 9 and 11, 12 similar to Figs. 2 to 4. The input arm 1, however, is formed as a parallel two-wire transmission line having a pair of inner conductors 32 and an outer shield 33 which is connected to the outer conductors 9 and 11 of the other arms 2, 3 and 4. The inner conductors 32 are connected together to form a loop 34 positioned within conductor 9 to be coupled with the magnetic field within the outer conductor 9 of the balancing arms 2 and 3. By virtue of the symmetric configuration, loop 34 is again differentially responsive to the currents flowing in the balancing arms 2 and 3 and provides a series connection for the input arm 1.

Fig. 9 shows a further embodiment of the present invention similar to Fig. 8, in which, however, the inner conductors 32 of the two-wire line forming arm 1 are directly connected to the inner conductor 8 of the balancing arms 2 and 3, equally displaced from the junction 5 of the inner conductors 8 and 12 of arms 3 and 4. Functionally, this circuit operates in the same manner as that of Fig. 8.

As many changes could be made in the above construction and many apparently widely different embodiments of this invention could be made without departing from the scope thereof, it is intended that all matter contained in the above description or shown in the accompanying drawing shall be interpreted as illustrative and not in a limiting sense.

What is claimed is:

1. An ultra high frequency bridge device comprising two coaxial line balancing arms, a third arm of coaxial line construction connected in shunt to said balancing arms and serving as input to said device, and a fourth arm of wave guide construction connected in series to said balancing arms by means of a slot, said fourth arm being the output arm of the bridge, and all of said arms being connected at a common point.

2. An ultra high frequency bridge device comprising two coaxial line balancing arms, a third arm of coaxial line construction connected to said balancing arms in shunt by means of a coaxial T-connection and serving as input to said device, and a fourth arm of wave guide construction connected in series to said balancing arms by means of a slot, said fourth arm being the output arm of the bridge and all of said arms being connected at a common point.

3. An ultra high frequency bridge device as in claim 2, wherein said slot, used to couple said output arm of wave guide construction to said coaxial balancing arms, is resonant, whereby a highly sensitive adjustment of said bridge is accomplished.

4. An ultra high frequency bridge device comprising two coaxial line balancing arms having a common outer conductor, an input arm of coaxial line construction connected in shunt with said balancing arms, and a fourth output arm of wave guide construction coupled in series to said balancing arms by means of a slot made in said outer conductor, said slot being formed at the common connection of said arms.

5. An ultra high frequency device as in claim 4, further including a microwave frequency generator connected to the input arm thereof.

6. An ultra high frequency bridge device as in claim 4, further comprising a detector connected to the output arm thereof, whereby the balancing arms may be suitably adjusted to give a null indication at the detector.

7. A high frequency bridge device, comprising a coaxial transmission line having an inner and an outer conductor, a second coaxial line having an inner conductor connected to said first inner conductor at a junction point intermediate the ends of said first line and also having an outer conductor connected to said first outer conductor, whereby said latter coaxial line is connected effectively in shunt with the two arms provided by the two portions of said first line on either side of said junction point, and a high frequency energy conductor coupled at said junction in symmetrical fashion to both said arms to be responsive solely to the difference in currents flowing in said two arms of said first line, whereby said two arms provide two balancing arms and said second line and said last-named conductor provide input and output arms for said bridge device.

8. High frequency apparatus as in claim 7 wherein said first outer conductor is provided with a slot opposite said junction point, and wherein said last-named energy conductor comprises a wave guide having an end communicating with said slot.

9. In combination, a first coaxial line section, a second coaxial line section having one end connected in shunt with said first line at a point intermediate the ends of said first line, and a wave guide connected in series with said first line by means of a slot in the outer conductor of said first line, the two connections to said first line being at substantially the same location along said first line.

THEODORE MORENO.

REFERENCES CITED

The following references are of record in the file of this patent:

UNITED STATES PATENTS

| Number | Name | Date |
|---|---|---|
| 2,257,783 | Bowen | Oct. 7, 1941 |
| 2,288,030 | Salinger | June 30, 1942 |
| 2,410,838 | Ring | Nov. 12, 1946 |
| 2,411,553 | Ramo | Nov. 26, 1946 |
| 2,425,084 | Cork et al. | Aug. 5, 1947 |
| 2,445,895 | Tyrrell | July 27, 1948 |
| 2,445,896 | Tyrrell | July 27, 1948 |

FOREIGN PATENTS

| Number | Country | Date |
|---|---|---|
| 558,977 | France | June 6, 1923 |